US010110108B2

(12) United States Patent
Bandera

(10) Patent No.: US 10,110,108 B2
(45) Date of Patent: *Oct. 23, 2018

(54) THREE DEGREE-OF-FREEDOM ELECTROMAGNETIC MACHINE CONTROL SYSTEM AND METHOD

(71) Applicant: HONEYWELL INTERNATIONAL INC., Morris Plains, NJ (US)

(72) Inventor: Pablo Bandera, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,023

(22) Filed: Dec. 5, 2016

(65) Prior Publication Data
US 2018/0159412 A1 Jun. 7, 2018

(51) Int. Cl.
H02K 41/02 (2006.01)
H02K 33/12 (2006.01)
(Continued)

(52) U.S. Cl.
CPC ............ *H02K 33/12* (2013.01); *H02K 26/00* (2013.01); *H02K 41/031* (2013.01); *H02P 7/03* (2016.02);
(Continued)

(58) Field of Classification Search
CPC ....... H02P 25/22; H02P 25/034; H02K 41/02; H02K 33/12
See application file for complete search history.

(56) References Cited

U.S. PATENT DOCUMENTS 4,661,737 A 4/1987 Barri
4,739,241 A 4/1988 Vachtsevanos et al.
(Continued)

FOREIGN PATENT DOCUMENTS

CN 102237834 B 10/2013
EP 1480318 A1 11/2004
(Continued)

OTHER PUBLICATIONS

Jun Luo et al.; Structural Design and Analysis of 3-DOF Bionic Eye Based on Spherical Ultrasonic Motor; Springer for Research & Development, Chapter—Intelligent Robotics and Applications, vol. 7506 of the series Lecture Notes in Computer Science pp. 348-356. Retrieved from Internet http://rd.springer.com/chapter/10.1007%2F9783642335099_34; Nov. 11, 2016.
(Continued)

*Primary Examiner* — Muhammad S Islam
(74) *Attorney, Agent, or Firm* — Lorenz & Kopf, LLP

(57) ABSTRACT

A multi-degree-of-freedom electromagnetic machine includes a stator, an armature, and a control. The stator includes a first, second, and third stator conductors that follow first, second, and third trajectories that are all different, and that together form a general shape of a surface. The armature is disposed adjacent to, and is movable relative to, the stator, and includes a plurality of spaced-apart armature coils. Each armature coil is configured, upon being electrically energized, to generate a magnetic field. The control is coupled to the first, second, and third stator conductors, and to the armature coils and is configured to: (i) supply DC to the stator conductors, and (ii) supply DC to one or more of the armature coils, to thereby generate one or more magnetic fields that interact with the stator conductors and vary an orientation of the one or more magnetic fields relative to the stator conductors.

11 Claims, 7 Drawing Sheets

(51) Int. Cl.
| | |
|---|---|
| *H02K 26/00* | (2006.01) |
| *H02K 41/03* | (2006.01) |
| *H02P 7/03* | (2016.01) |
| *H02P 25/034* | (2016.01) |
| *H02P 25/22* | (2006.01) |

(52) U.S. Cl.
CPC ............ *H02P 25/034* (2016.02); *H02P 25/22* (2013.01); *H02K 2201/18* (2013.01)

(56) References Cited

U.S. PATENT DOCUMENTS

| | | | | |
|---|---|---|---|---|
| 5,204,573 | A | * | 4/1993 | Bederson ............ H02K 41/031 248/183.1 |
| 6,906,441 | B2 | | 6/2005 | Mendenhall |
| 6,909,205 | B2 | | 6/2005 | Corcoran et al. |
| 7,675,208 | B2 | | 3/2010 | Bandera |
| 2002/0130561 | A1 | | 9/2002 | Temesvary et al. |
| 2004/0124717 | A1 | * | 7/2004 | Corcoran ............... G05G 9/047 310/12.14 |
| 2004/0232790 | A1 | * | 11/2004 | Mendenhall ........... H02K 41/03 310/112 |
| 2008/0073989 | A1 | | 3/2008 | Bandera |
| 2014/0125153 | A1 | * | 5/2014 | Ho ....................... H02K 41/031 310/36 |
| 2014/0191626 | A1 | * | 7/2014 | Hollis, Jr. ............. H02K 41/025 310/68 B |
| 2014/0203685 | A1 | | 7/2014 | Vandenba Viere et al. |
| 2014/0209751 | A1 | | 7/2014 | Stagmer |

FOREIGN PATENT DOCUMENTS

| | | |
|---|---|---|
| EP | 2032888 B1 | 2/2011 |
| FR | 2040907 A5 | 1/1971 |
| JP | H0685630 B2 | 10/1994 |
| WO | 9919971 A1 | 4/1999 |

OTHER PUBLICATIONS

Kaneko, K. et al.; A Spherical DC Servo Motor With Three Degrees of Freedom; Reprinted from Sep. 1989, vol. 111, Journal of Dynamic Systems, Measurement, and Control, Transactions of the ASME.

Nishiura, Y., et al.; 3-DOF outer rotor electromagnetic spherical actuator; Osaka University, Suita, Japan; INTERMAG 2015.

Bolognesi, P., et al.; Electromagnetic Actuators Featuring Multiple Degrees of Freedom: a Survey; Department of Electric Systems & Automation—University of Pisa; Paper to be presented at ICEM 2004 Conference, Krakow (Poland) Sep. 5-8, 2004.

Wang, J, et al.; A Novel Spherical Permanent Magnet Actuator with Three Degrees-of-Freedom; Department of Electronic and Electrical Engineering, The University of Sheffield, IEEE Transactions on Magnetics, vol. 34, No. 4, Jul. 1998.

Yan, L., et al.; Torque Modeling and Analysis of Spherical Actuators with Iron Stator; 2009 IEEE International Conference on Robotics and Automation,Kobe International Conference Center, Kobe, Japan, May 12-17, 2009.

Extended EP Search Report for Application No. 17177981.2-1809 dated Nov. 22, 2017.

EP Examination Report for Application No. 17177981.2-1201 dated Mar. 27, 2018.

Extended EP Search Report for Application No. 17204227.7 dated Mar. 23, 2018.

\* cited by examiner

THREE DEGREE-OF-FREEDOM ELECTROMAGNETIC MACHINE CONTROL SYSTEM AND METHOD

TECHNICAL FIELD

The present invention generally relates to electromagnetic machines, and more particularly relates to systems and methods for controlling an electromagnetic machine in three degrees-of-freedom.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

One solution to the above-described problems is disclosed in U.S. Pat. No. 7,675,208, entitled "Global Pointing Actuator." The actuator disclosed therein includes a spherical stator with a "latitude coil" and a "longitude coil" wound thereon. This actuator, however, also exhibits certain drawbacks. For example, while it can move its associated armature, and thus a device coupled to the armature, in two degrees of freedom by applying direct current (DC) to one or both coils, it cannot do so in three DoF.

Hence, there is a need for a multi-DoF electromechanical machine that is relatively smaller, less cumbersome, and more efficient than known devices and/or can simultaneously controlled in three DoF. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree-of-freedom electromagnetic machine includes a stator, an armature, and a control. The stator includes a first stator conductor, a second stator conductor, and a third stator conductor. The first stator conductor follows a first general trajectory, the second stator conductor follows a second general trajectory that is different from the first general trajectory, and the third stator conductor follows a third general trajectory that is different from the first and second general trajectories. The first stator conductor, the second stator conductor, and the third stator conductor together form a general shape of a surface. The armature is disposed adjacent to, and is movable relative to, the stator. The armature includes a plurality of spaced-apart armature coils. Each armature coil is configured, upon being electrically energized, to generate a magnetic field. The control is coupled to the first, second, and third stator conductors, and to the armature coils. The control is configured to: (i) supply direct current (DC) to the first, second, and third stator conductors, and (ii) supply DC to one or more of the armature coils, to thereby generate one or more magnetic fields that interact with the stator conductors and vary an orientation of the one or more magnetic fields relative to the stator conductors, to thereby generate desired rotation of the armature, relative to the stator, about one or more perpendicular axes.

In another embodiment, a multi-degree-of-freedom electromagnetic machine includes a spherical stator, a first stator conductor, a second stator conductor, a third stator conductor, an armature, and a control. The spherical stator has a first axis of symmetry, a second axis of symmetry, and a third axis of symmetry, where the first, second, and third axes of symmetry are disposed perpendicular to each other. The first stator conductor is disposed on the spherical structure about the first axis of symmetry, the second stator conductor is disposed on the spherical structure about the second axis of symmetry, and the third stator conductor is disposed on the spherical structure about the third axis of symmetry. The armature is disposed adjacent to, and is movable relative to, the stator. The armature includes a plurality of spaced-apart armature coils, and each armature coil is configured, upon being electrically energized, to generate a magnetic field. The control is coupled to the first, second, and third stator conductors, and to the armature coils. The control is configured to: (i) supply direct current (DC) to the first, second, and third stator conductors, and (ii) supply DC to one or more of the armature coils, to thereby generate one or more magnetic fields that interact with the stator conductors and vary an orientation of the one or more magnetic fields relative to the stator conductors, to thereby generate desired rotation of the armature, relative to the stator, about one or more perpendicular axes.

In yet another embodiment, method of controlling a multi-degree-of-freedom electromagnetic machine that includes a stator and an armature, wherein the stator includes a first stator conductor, a second stator conductor, and a third stator conductor, where the first stator conductor follows a first general trajectory, the second stator conductor follows a second general trajectory that is different from the first general trajectory, the third stator conductor follows a third general trajectory that is different from the first and second general trajectories, and where the first stator conductor, the second stator conductor, and the third stator conductor together form a general shape of a surface; and wherein the armature is disposed adjacent to, and is movable relative to, the stator and includes a plurality of spaced-apart armature coils, includes controllably supplying direct current (DC) to one or more of the first, second, and third stator conductors, and controllably supplying DC to one or more of the armature coils, to thereby generate one or more magnetic fields that interact with the stator conductors and vary an orientation of the one or more magnetic fields relative to the stator conductors, to thereby generate desired rotation of the armature, relative to the stator, about one or more perpendicular axes.

Furthermore, other desirable features and characteristics of the multi-degree of freedom electromechanical machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, it is noted that the multi-degree of freedom machine disclosed herein is, for ease of explanation and illustration, generally described as operating as a motor. Persons of ordinary skill in the art will appreciate, however, that the disclosed machine may also be operated as a generator by moving the armature with an external force and inducing currents in the conductors, or as a sensor (e.g., a rate sensor from generated back EMF), or numerous other devices. It should also be noted that although some of the conductors may be depicted as curved, this is done merely to convey a three-dimensional (3D) spherical shape.

Figure 1:
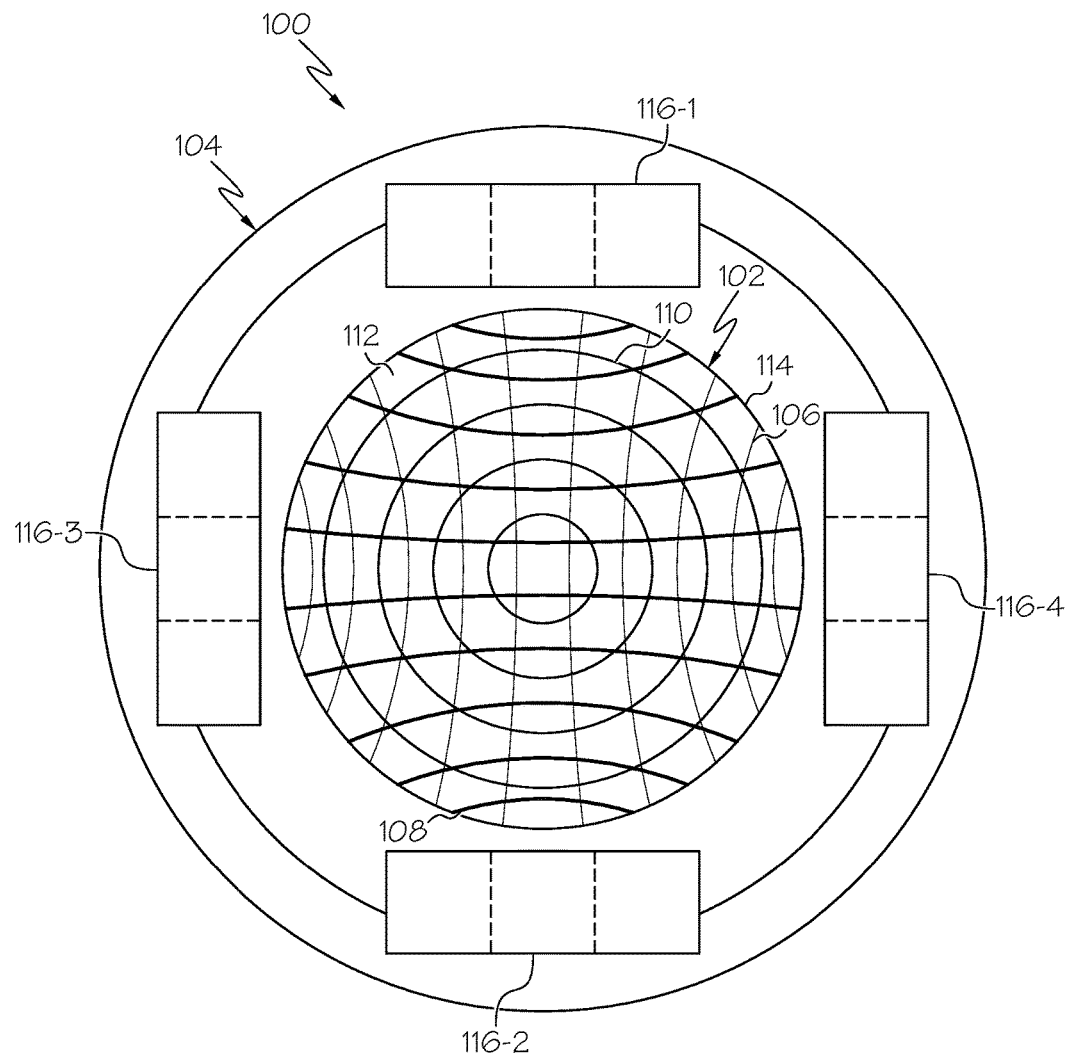
FIG. 1 depicts a simplified cross section view of one example embodiment of a multi-degree of freedom electromagnetic machine.

With reference now to FIG. 1, a simplified cross section view of one embodiment of a multi-degree of freedom electromagnetic machine 100 is depicted, and includes a stator 102 and an armature 104. The stator 102 includes a first stator conductor 106, a second stator conductor 108, and a third stator conductor 110. It will be appreciated that the stator conductors 106, 108, 110 are each formed of any one of numerous types and shapes of electrically conductive materials, and may be implemented using one or a plurality of these conductive materials. It will additionally be appreciated that the stator conductors 106, 108, 110 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

Figure 2:
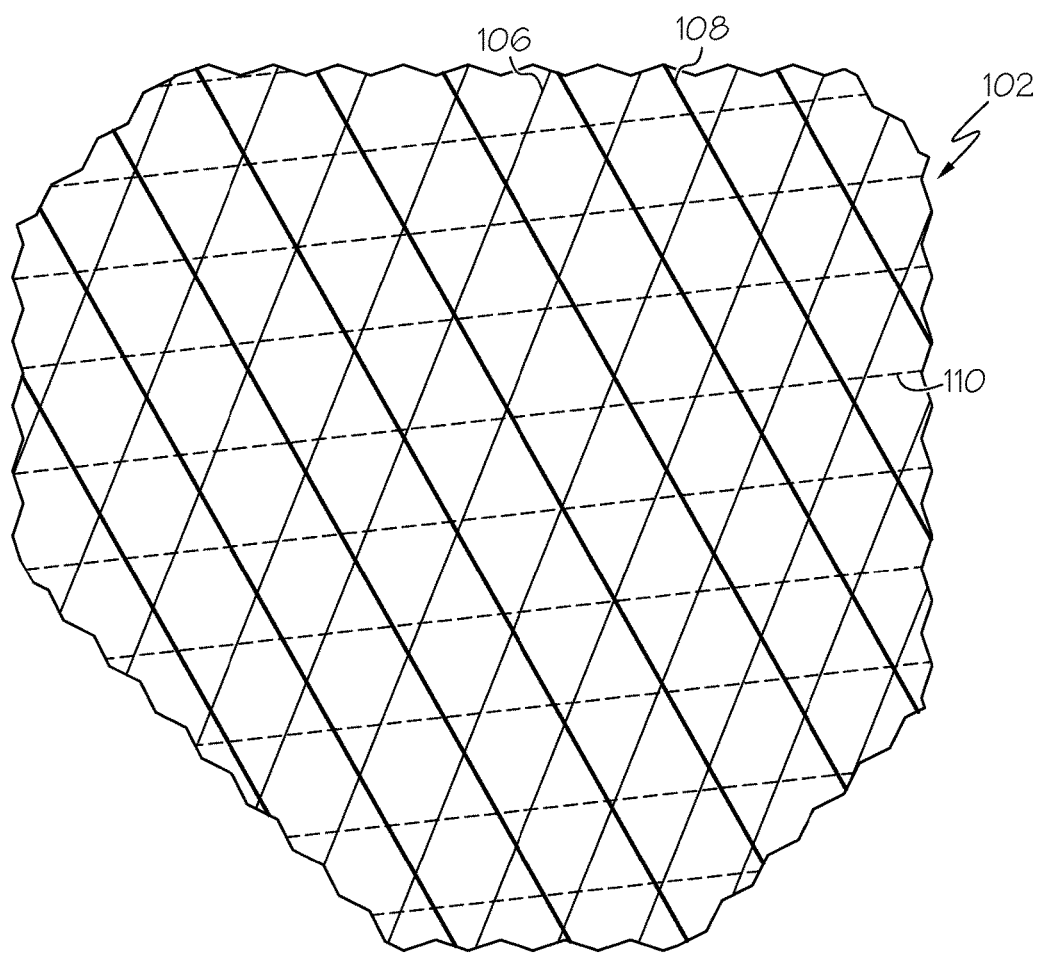
FIG. 2 depicts a simplified representation of a portion of another embodiment of a multi-degree-of-freedom electromagnetic machine.

Regardless of the number, configuration, implementation, or type of materials used, the stator conductors 106, 108, 110 are disposed such that each follows a different general trajectory. In particular, it is seen that the first stator conductor 106 follows a first general trajectory, the second stator conductor 108 follows a second general trajectory that is different from the first general trajectory, and the third stator conductor 110 follows a third general trajectory that is different from the first and second general trajectories. In the embodiment depicted in FIG. 1, the trajectories are orthogonal to each other. It will be appreciated, however, that in some embodiments, such as the one depicted in FIG. 2, two or all three of the trajectories may be disposed at equal or non-equal arbitrary and non-orthogonal angles relative to each other angles.

Before proceeding further, it is noted that the term "trajectory(ies)," as used herein, means the geometric path traced by a conductor over a predefined length that is designed to contribute to the generation of a Lorentz force (described further below). For example, in some embodiments there may be some conductive lengths that may follow a trajectory to, for example, a power supply. These lengths, however, do not contribute to the Lorentz force, and likely do not contribute to the general shape of the surface. It is additionally noted that the stator conductors 106, 108, 110 may be wound manually with wires, or may be printed onto a flexible or spherical surface using known printing methods. Moreover, each conductor 106, 108, 110 may have different characteristics. For example, the stator conductors 106, 108, 110 may differ from each other in size, number of turns, and resistance, and may also be machined or formed as a solid piece, just to name a few characteristics. Doing so allows one to relatively easily and independently tailor each axis to have different performance characteristics, if needed or desired.

Returning to the description, the first, second, and third trajectories are such that together the stator conductors 106, 108, 110 form the general shape of a surface. The surface can be formed by simply overlaying the conductors (and securing them, e.g. via adhesive), or may be formed by weaving two or more conductors. In the case of weaving, attention to the effects of the waviness on overall efficiency may need to be considered, as the Lorentz force produced on the conductor is a function of the angle between the magnetic field and the current path. Thus, if the field and the current are not orthogonal to each other, the force is reduced.

Figure 3:
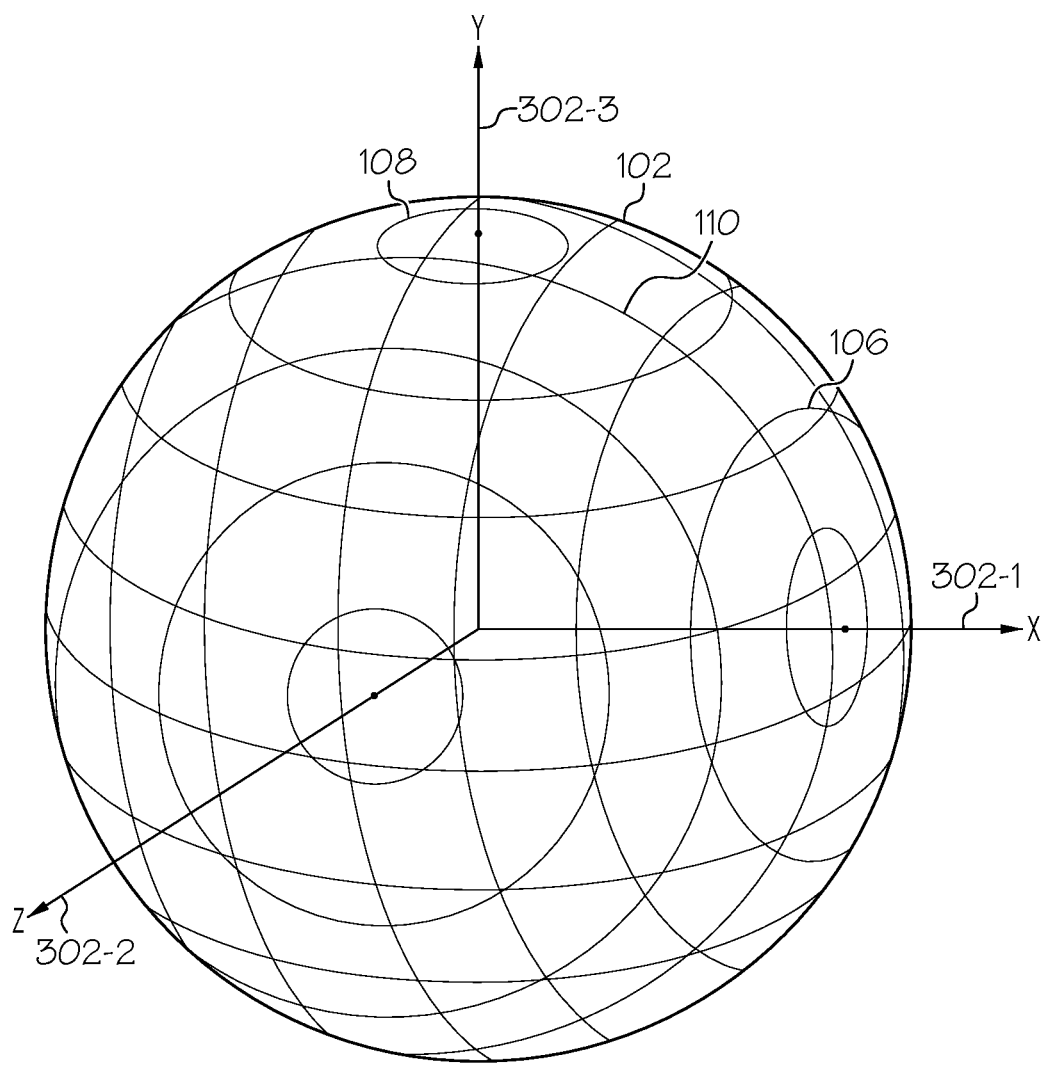
FIG. 3 depicts a perspective view of an embodiment of a spherical structure with orthogonally arranged conductor sets disposed thereon.

The type and shape of the surface may vary, and may be a closed surface, an open surface, a combination of closed and open surfaces, a planar surface, a non-planar surface, or a combination of planar and non-planar surfaces. For example, the surface may be spherical, semispherical, toroidal, cylindrical, cubic, flat, a half-pipe, or various combinations thereof, just to name a few. In the embodiment depicted in FIG. 1, and as is depicted more clearly in FIG. 3, the surface is spherical, and thus has three perpendicularly disposed axes of symmetry 302—a first axis of symmetry 302-1, a second axis of symmetry 302-2, and a third axis of symmetry 302-3. In this embodiment, the first stator conductor 106 is disposed about the first axis of symmetry 302-1, the second stator conductor 108 is disposed about the second axis of symmetry 302-2, and the third stator conductor 110 is disposed about the third axis of symmetry 302-3. It should be noted that a sphere has an infinite number of axes of symmetry. Thus, the first, second, and third axes of symmetry 302-1, 302-2, 302-3, could be any one of these axes of symmetry, so long as all three axes of symmetry are perpendicular to each other.

Returning once again to FIG. 1, it is noted that in some embodiments the stator 102 comprises only the stator conductors 106, 108, 110. In other embodiments, however, the stator 102 further comprises a first body 112. The first body 112, when included, is preferably formed of magnetically permeable material and has an outer surface 114. As is well known, such materials are used to conduct magnetic flux efficiently through the magnetic circuit, and to guide the flux to desired points/locations. Numerous suitable materials are known and include, for example, magnetic steel, iron, and iron alloys (e.g., silicon iron, iron-cobalt, vanadium). At least a portion of the outer surface 114 of the first body 112 preferably has the general shape of the surface, and the stator conductors 106, 108, 110 are disposed at least adjacent to at least the portion of the outer surface 114 of the first body 112.

The armature 104 is disposed adjacent to the stator 102, and is mounted such that it is movable relative to the stator 102. Preferably, the armature 104 is mounted such that it is movable, relative to the stator 102, about all three of the axes of symmetry 302. As a result, a non-depicted device, such as a sensor, a laser, or other suitable device, which may be mounted on an outer surface of the armature 104, may be moved to a desired position. The manner in which this movement is accomplished will be described further below.

The armature 104 includes a plurality of armature coils 116. In the depicted embodiment, the armature 104 includes four armature coils (e.g., 116-1, 116-2, 116-3, 116-4). It will be appreciated that in other embodiments the armature 104 could include other numbers of armature coils 116, if needed or desired. For example, two or more of the armature coils 116 could be connected together, and thus be considered one armature coil 116. Each armature coil 116 is wound onto a portion of the armature 104 and, at least in the depicted embodiment, 118 extends inwardly from the armature 104. The armature 104 preferably comprises a magnetically permeable material such as, for example, iron or an iron alloy, and may completely or partially surround the stator 102.

It will be appreciated that the armature coils 116 may be variously shaped, dimensioned, and disposed. In the embodiment depicted in FIG. 1, the armature coils 116 are spaced apart from the stator 102 by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the armature coils 116 may contact the stator 102. In such embodiments, the material selection of the contacting surfaces is chosen in consideration of wear and frictional losses, as is known in the art. Regardless of the shape, dimension, and disposition, each of the armature coils 116 are configured, when energized with direct current (DC), to generate magnetic field lines similar to those of permanent magnets.

The configuration of the stator conductors 106, 108, 110, and the armature coils 116 is such that, when one or more of the armature coils 116 are energized with DC, the generated magnetic field lines traverse the stator 102. As may be appreciated, when DC is supplied to one or more of the stator conductors 106, 108, 110, the above-mentioned Lorentz force is generated between the energized conductor(s) 106, 108, 110 and the energized armature coils 116, which in turn generates in a torque about one or more of the axes of symmetry 302. Because the stator 102 is fixedly mounted, the torque that is generated will cause the armature 104 to move to an armature position relative to the stator 102.

Figure 4:
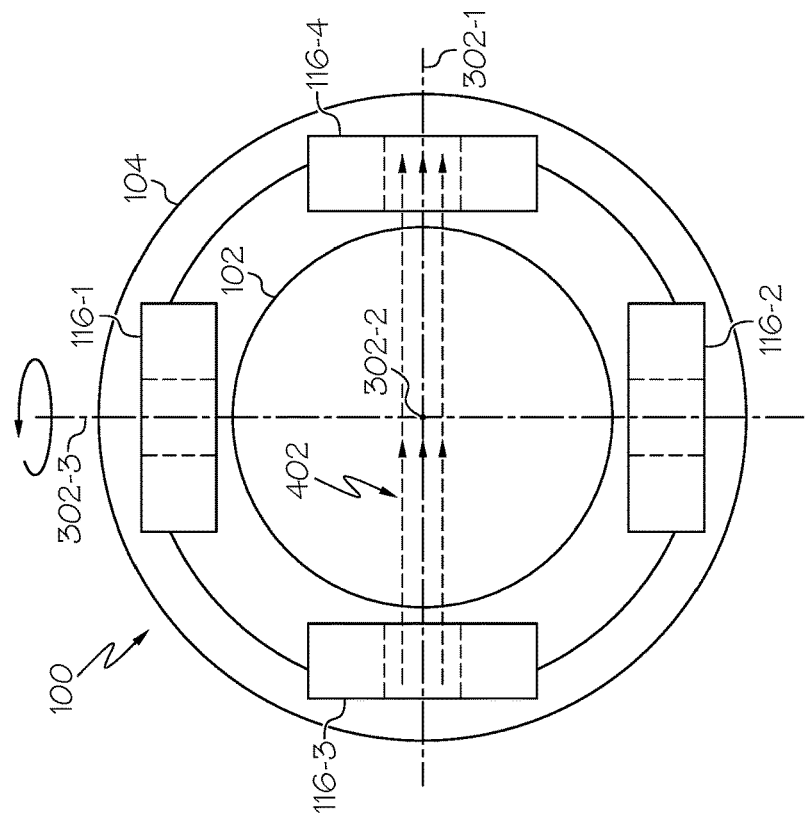
FIGS. 4-6 depicts a simplified cross section views of the multi-degree of freedom electromagnetic machine of FIG. 1, illustrating how rotation about various axes is generated.
Figure 5:
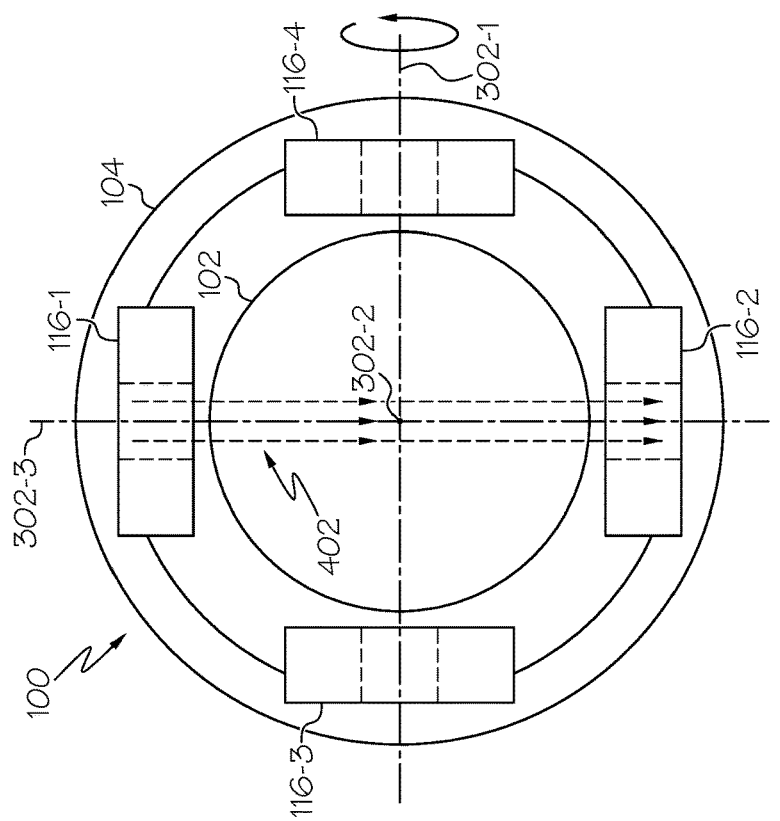
Figure 6:
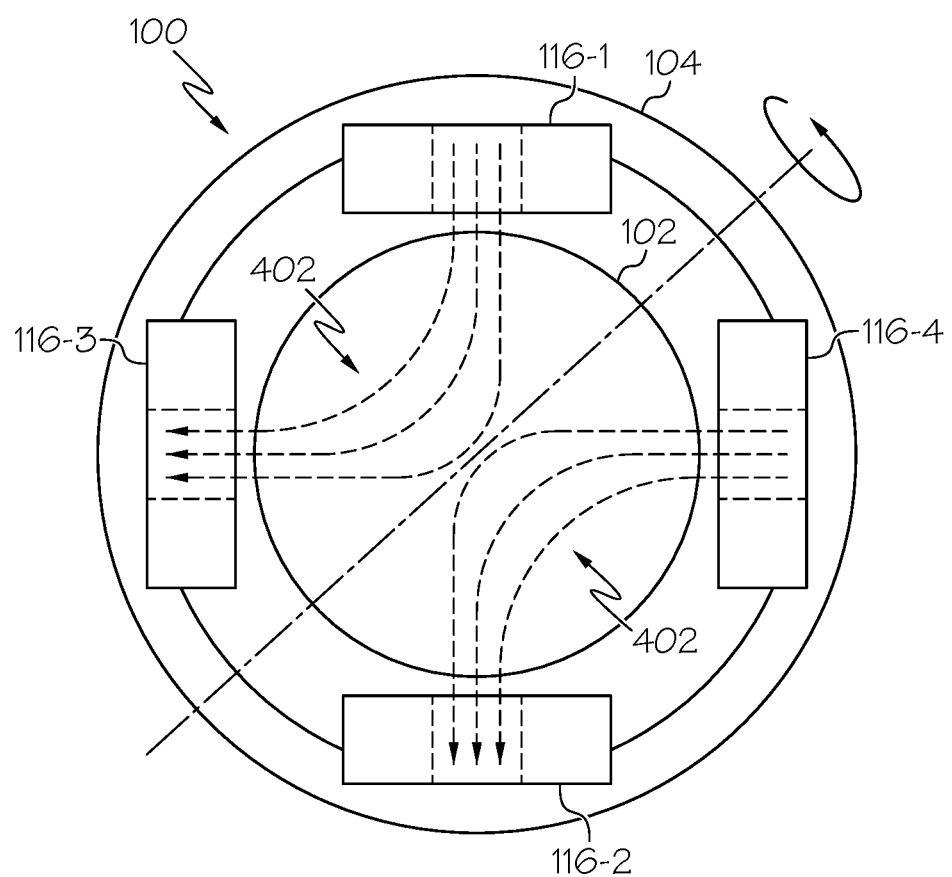

More specifically, and as FIGS. 4 and 5 depict, for a given energization of the stator conductors 106, 108, 110, energizing only opposing sets of armature coils 116 (e.g., 116-1 and 116-2 or 116-3 and 116-4) generates motion only about the axis of symmetry 302 that is perpendicular to the magnetic field lines 402. As FIG. 6 depicts, by simultaneously energizing three or more armature coils 116, or by varying the ratio of currents in different armature coils 116, the overall direction of the magnetic field lines 402 going through the stator conductors 106, 108, 110 can be controllably oriented, allowing rotation of the armature 104 about any axis that is perpendicular to the centerline of the armature 104.

The direction of rotation about a given axis 302 may also be varied either by varying the polarity of currents in the stator conductors 106, 108, 110 or in the armature coils 116. In this way, the magnetic field generated by the armature 104 that travels through the stator conductors 106, 108, 110 can be actively modified to change the relative orientation of the generated magnetic fields, which in turn allows the armature 104 to rotate about different axes 302-1, 302-2, 302-3 relative to the stator 102.

In the embodiments depicted in FIGS. 1-6, the armature coils 116 are the sole source of the generated magnetic flux. In other embodiments, such as the one depicted in FIGS. 7 and 8, the machine 100 may additionally include a plurality of permanent magnets 702. In the depicted embodiment, the machine 100 is implemented with four permanent magnets—a first magnet 702-1, a second permanent magnet 702-2, a third permanent magnet 702-3, and a fourth permanent magnet 702-4—and an armature coil 116 associated with each permanent magnet 702. It will be appreciated that other numbers of permanent magnets 702 and armature coils 116 could be used. For example, in some embodiments one armature coil 116 could be associated with two or more of the permanent magnets 702.

Regardless of the number of permanent magnets 702 and armature coils 116, with these embodiments, relatively smaller armature coils 116 can be used to direct the magnetic field lines generated by permanent magnets 702. This has the advantage of increasing the efficiency of the machine 100 by taking advantage of the energy in the permanent magnets 702.

Figure 8:
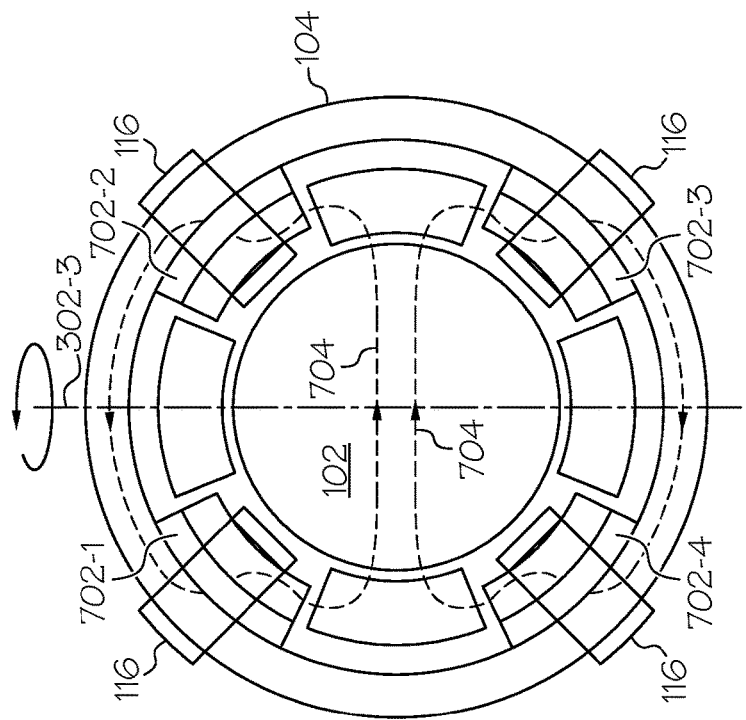
FIGS. 7 and 8 depict simplified representations of another embodiment of a multi-degree-of-freedom electromagnetic machine.
Figure 7:
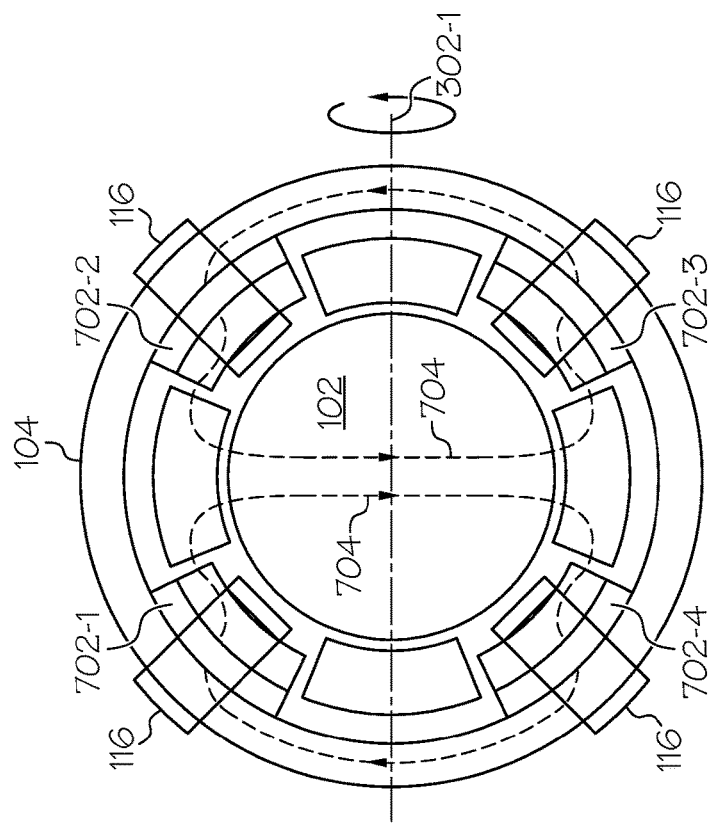

Energizing the armature coils 116 in the manner depicted in FIG. 7 directs the magnetic field 704 from the first and second permanent magnets 702-1, 702-2 to the fourth and third permanent magnets 702-4, 702-3, respectively. This generates rotation about the first axis 302-1. As FIG. 8 depicts, reversing the polarity of the current in the armature coils 116 directs the magnetic field 704 from the first and fourth permanent magnets 702-1, 702-4 to the second and third permanent magnets 702-2, 702-3, respectively. This generates rotation about the third axis 302-3.

Figure 9:
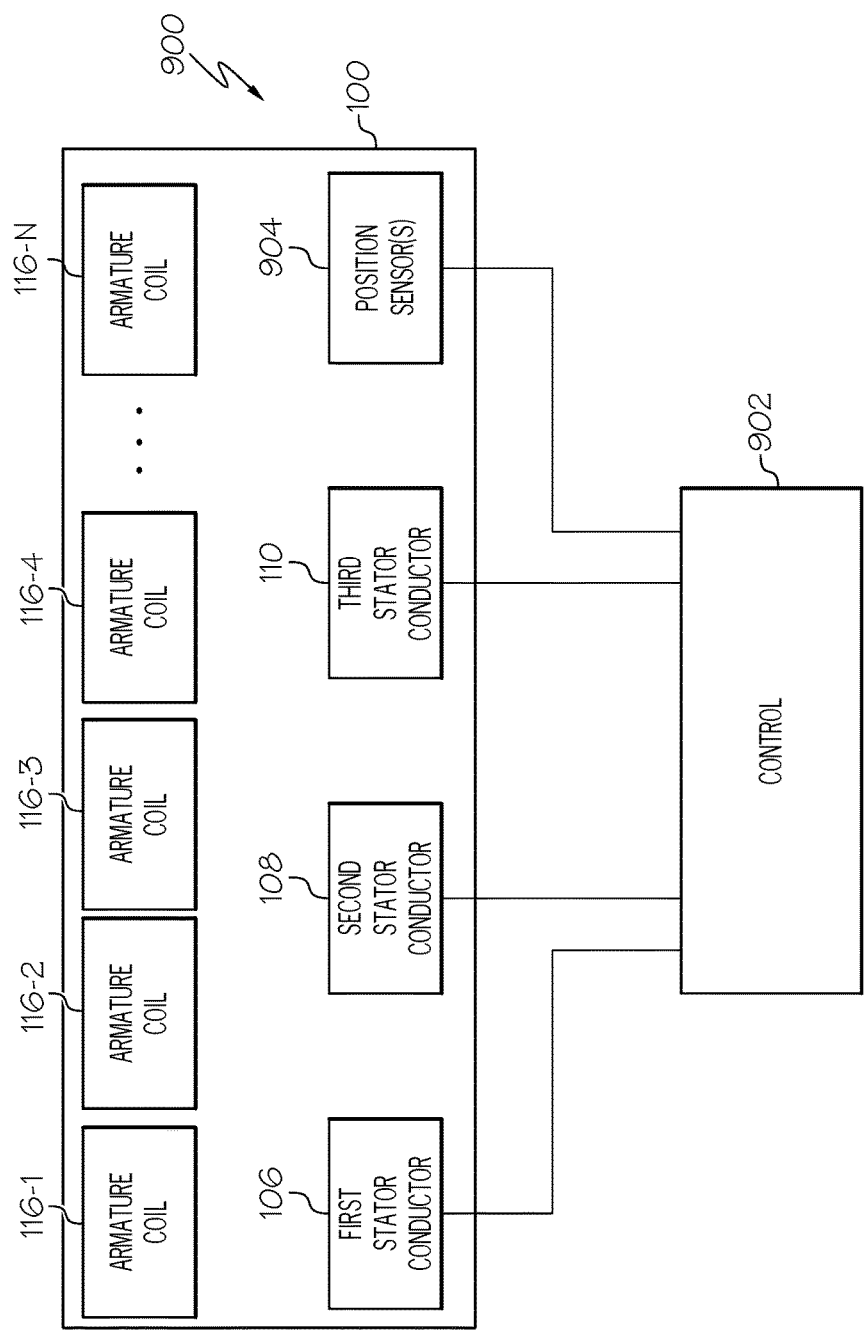
FIG. 9 depicts a functional block diagram of a multi-degree of a control system that may be used to control the electromagnetic machines described herein.

Referring now to FIG. 9, a functional block diagram of a multi-degree of freedom actuation control system 900 that includes the multi-degree of freedom electromechanical machine 100 of FIG. 1 is depicted. As FIG. 9 depicts, the system 900 includes a control 902 that is coupled to each of the stator conductors 106, 108, 110 and to each of the armature coils 116. The control 902 is configured to control the current magnitudes and directions in each of the stator conductors 106, 108, 110 and each of the armature coils 116 to thereby control the spin rate and direction, and the tilt angle, of the armature 102. The control 902 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 902. Some non-limiting examples of suitable control techniques include PWM control and back EMF control.

If the control 902 implements closed-loop control, then the control system 900 additionally includes one or more position sensors 904. The number and type of position sensors 904 may vary. For example, the system 900 may include one or more sensors 904 to independently sense the position of the armature 104. Such sensors may be implemented using optical sensors, track balls, rotary sensors, or the like.

The multi-degree of freedom machine 100 disclosed herein allows the armature 104 to be controllably moved in three degrees-of-freedom relative to the stator 102. The armature position may be controlled by not only controlling the magnitudes and directions of the DC in the stator conductors 106, 108, 110, but also (or instead) by controlling the magnitude and directions the DC in the armature coils 116.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed:

1. A multi-degree-of-freedom electromagnetic machine, comprising:
    a stator comprising a first stator conductor, a second stator conductor, and a third stator conductor, the first stator conductor following a first general trajectory, the second stator conductor following a second general trajectory that is different from the first general trajectory, the third stator conductor following a third general trajectory that is different from the first and second general trajectories, the first stator conductor, second stator conductor, and third stator conductor together forming a general shape of a surface;
    an armature disposed adjacent to, and movable in three degrees-of-freedom relative to, the stator, the armature surrounding at least a portion of the stator and including a plurality of spaced-apart armature coils, each armature coil configured, upon being electrically energized, to generate a magnetic field; and
    a control coupled to the first, second, and third stator conductors, and to the armature coils, the control configured to:
        (i) supply direct current (DC) to the first, second, and third stator conductors, and
        (ii) supply DC to one or more of the armature coils, to thereby generate one or more magnetic fields that interact with the stator conductors and vary an orientation of the one or more magnetic fields relative to the stator conductors, to thereby generate desired rotation of the armature, relative to the stator, about up to three perpendicular axes.

2. The machine of claim 1, further comprising:
a plurality of permanent magnets coupled to the armature, each armature coil associated with one or more of the permanent magnets.

3. The machine of claim 1, wherein:
the first stator conductor, the second stator conductor, and the third stator conductor comprise a plurality of electrically conductive segments; and
each of the electrically conductive segments comprises a conductor of predetermined length.

4. The machine of claim 1, wherein the first stator conductor, the second stator conductor, and the third stator conductor comprise a contiguous conductor.

5. The machine of claim 1, wherein:
the stator further comprises a first body formed of magnetically permeable material and having an outer surface, at least a portion of the outer surface having the general shape of the surface; and
the first stator conductor, the second stator conductors, and the third stator conductor are disposed at least adjacent at least the portion of the outer surface of the stator.

6. The machine of claim 1, wherein:
the surface is a sphere; and
the first, second, and third general trajectories are such that the first stator conductor, the second stator conductor, and the third stator conductor are oriented at predetermined angles relative to each other.

7. A multi-degree-of-freedom electromagnetic machine, comprising:
a spherical stator having a first axis of symmetry, a second axis of symmetry, and a third axis of symmetry, the first, second, and third axes of symmetry disposed perpendicular to each other;
a first stator conductor disposed on the spherical stator about the first axis of symmetry;
a second stator conductor disposed on the spherical stator about the second axis of symmetry;
a third stator conductor disposed on the spherical stator about the third axis of symmetry;
an armature disposed adjacent to, and movable in three degrees-of-freedom relative to, the stator, the armature surrounding at least a portion of the spherical stator and including a plurality of spaced-apart armature coils, each armature coil configured, upon being electrically energized, to generate a magnetic field; and
a control coupled to the first, second, and third stator conductors, and to the armature coils, the control configured to:
(i) supply direct current (DC) to the first, second, and third stator conductors, and
(ii) supply DC to one or more of the armature coils, to thereby generate one or more magnetic fields that interact with the stator conductors and vary an orientation of the one or more magnetic fields relative to the stator conductors, to thereby generate desired rotation of the armature, relative to the stator, about up to three perpendicular axes.

8. The machine of claim 7, further comprising:
a plurality of permanent magnets coupled to the armature, each armature coil associated with one or more of the permanent magnets.

9. The machine of claim 7, wherein:
the first stator conductor, the second stator conductor, and the third stator conductor comprise a plurality of electrically conductive segments; and
each of the electrically conductive segments comprises a conductor of predetermined length.

10. The machine of claim 7, wherein the first stator conductor, the second stator conductor, and the third stator conductor comprise a contiguous conductor.

11. The machine of claim 7, wherein:
the spherical stator further comprises a first body formed of magnetically permeable material and having an outer surface; and
the first stator conductor, the second stator conductors, and the third stator conductor are disposed at least adjacent at least the portion of the outer surface of the first body.

* * * * *